(12) United States Patent
Martin et al.

(10) Patent No.: US 9,367,684 B2
(45) Date of Patent: *Jun. 14, 2016

(54) DATA SECURITY SEEDING SYSTEM

(75) Inventors: Trent Martin, Elgin, IL (US); Karolyn Tincher, Geneva, IL (US); Philip Tincher, Geneva, IL (US); Robert B. Rich, Wilmington, NC (US)

(73) Assignee: RealSource, Inc., Elgin, IL (US)

( * ) Notice: Subject to any disclaimer, the term of this patent is extended or adjusted under 35 U.S.C. 154(b) by 1057 days.

This patent is subject to a terminal disclaimer.

(21) Appl. No.: 13/479,426

(22) Filed: May 24, 2012

(65) Prior Publication Data

US 2013/0160116 A1   Jun. 20, 2013

Related U.S. Application Data (63) Continuation-in-part of application No. 13/326,491, filed on Dec. 15, 2011, now Pat. No. 8,213,589.

(51) Int. Cl.
    H04M 3/42    (2006.01)
    G06F 21/55   (2013.01)
    G06F 17/30   (2006.01)
    H04L 29/06   (2006.01)

(52) U.S. Cl.
    CPC ........ G06F 21/554 (2013.01); G06F 17/30516 (2013.01); H04L 63/1491 (2013.01); *G06F 2221/2117* (2013.01); *H04L 2463/146* (2013.01)

(58) Field of Classification Search
    USPC ........ 379/88.19–88.21, 93.02, 93.03, 112.01, 379/142.05, 142.06, 201.11, 210.02, 210.03
    See application file for complete search history.

(56) References Cited

U.S. PATENT DOCUMENTS

| | | | |
|---|---|---|---|
| 6,145,083 | A  | 11/2000 | Shaffer et al. |
| 6,360,324 | B2 | 3/2002  | Van Blarkom |
| 6,833,787 | B1 | 12/2004 | Levi |
| 7,917,532 | B1 | 3/2011  | Wisilosky et al. |
| 7,937,579 | B2 | 5/2011  | Peckover |
| 2002/0038431 | A1 | 3/2002 | Chesko |
| 2005/0177559 | A1 | 8/2005 | Nemoto |
| 2006/0166658 | A1 | 7/2006 | Bennett et al. |
| 2010/0094791 | A1 | 4/2010 | Miltonberger |

(Continued)

FOREIGN PATENT DOCUMENTS

| KR | 10-2008-0044010 | 5/2009 |
| KR | 10-2010-0138291 | 12/2010 |

OTHER PUBLICATIONS

PCT International Search Report of coresponding PCT Application, PCT/US2012/069114, Apr. 3, 2013.

(Continued)

*Primary Examiner* — MD S Elahee
(74) *Attorney, Agent, or Firm* — Much Shelist (57) ABSTRACT

In one aspect of the invention there is provided a system for tracking seed data that has been inserted into a secured private information database listing. The system includes a network, computer, and database. Incoming communications to the network are monitored and are matched to a phone number, credit card number, address, email, or fax number that corresponds to the seed data. Depending on the incoming communication software is configured to track and store third party identification information. The information is sent to a user to determine if the incoming phone call was conducted by breaching the secured private information database listing.

10 Claims, 4 Drawing Sheets

(56) References Cited

U.S. PATENT DOCUMENTS

2010/0191661 A1 7/2010 Pritchett et al.
2011/0138446 A1 6/2011 Barrett et al.

OTHER PUBLICATIONS

S.Mohan Ramesh Maudu et al., Data Leakage Detection Tool, International Journal of Science and Advanced Technology, Jul. 5, 2011, vol. 1, No. 5, pp. 274-276, ISSN 221-8386.

FIGURE 1

| Customer ID ~105 | Name ~110 | Address ~115 | Phone Number ~120 | Email ~125 | Credit Card/Debit Card ~130 |
|---|---|---|---|---|---|
| 101 | John Smith | 123 Holiday Road Chicago, IL 60606 | 312-123-4567 | j@smith.com | 4356-7845-9834-2354 |
| . | . | . | . | . | . |
| . | . | . | . | . | . |
| 432 | John Doe | 456 Dummy Ave Los Angeles, CA 90041 | 310-328-9800 | johndoe@abc.com | 4123-7898-8042-4023 |
| . | . | . | . | . | . |
| . | . | . | . | . | . |
| 10234 | Jane Roth | 321 State Street Madison, WI 53701 | 608-435-4321 | jroth@xyz.com | 4987-0231-4687-9318 |

DATA SECURITY SEEDING SYSTEM

CROSS-REFERENCE TO RELATED INVENTIONS

The present application is a continuation in part of U.S. application Ser. No. 13/326,491 filed Dec. 15, 2011, which is hereby incorporated herein by reference.

BACKGROUND OF THE INVENTION

Many companies retain private information such as customer or consumer data. This data of private information that can be used specifically for future marketing and/or communication with a company's customers, employees, vendors and/or business partners. However, if that information is not properly controlled problems may arise. The unauthorized use or release of the private information can be detrimental to a company as companies and people become hesitant to do business with a company that cannot properly control and maintain in secrecy and confidence its collected private information.

While maintaining private information internally within a company can often be difficult, further issues arise when the private information is outsourced to external third party companies. Outsourcing the private information for telemarketing, direct mailing, and email marketing is extremely common in today's global economy. The release of private information to a third party is typically done under extreme confidence, but unfortunately leaks may still occur. As such internal and external factors are working against a company and its ability to maintain its private information.

In systems used today, false information is inserted into a company's private information, otherwise known as seed data. The seed data is then tracked and when an email or direct mail is sent to the seed data, the company can determine the email or direct mail was part of its own marketing efforts or if the private information was leaked. This can hopefully provide the company with the knowledge that its private information has been leaked. Acting quickly in these situations can sometimes help stop the release and use of its private information. Unfortunately, the prior system are far from perfect and become more difficult to use in today's new generation of internet based telecommunication technology platforms.

SUMMARY OF THE INVENTION

One or more of the embodiments provided in the present invention relates to tracking seed data. Seed data may be defined in a number of different embodiments, but will in most instances include information relating to a name, phone number, email address, and credit card/debit card numbers. The seed data is inserted into a secured private information database listing. A system in accordance with one embodiment includes a network, a computer connected to the network, and a database connected to the computer. The database is configured to store a record of the seed data and further configured to store a pre-recorded voice message corresponding to a phone number defined by the seed data. The computer is configured to monitor incoming communications to the network. Upon receiving a notice of an incoming phone call placed to the phone number corresponding to the seed data, the computer is further configured to playback to a recipient of the incoming phone call, the pre-recorded voice message and further configured to store a caller identification phone number and/or record a caller voice message from the incoming phone call. The computer is further configured to forward the caller identification phone number and/or recorded caller voice message from the incoming phone call to a user for a determination of whether the incoming phone call was conducted by breaching the secured private information database listing.

In various aspects of the embodiment, the incoming communications can include e-mails, notification of attempted credit card/debit card transactions, and telecommunication (wireless/wired) calls. And the network can further include an IP-PBX network. In addition, the system may further include configuring the computer to store a copy of an incoming email made to an email address corresponding to the seed data and further configured to forward the copy of the incoming email to the user for a determination of whether the incoming email was conducted by breaching the secured private information database listing.

In addition, the system may further include configuring the computer to store a copy of an incoming attempted credit, card/debit card transaction made to an credit card/debit card number corresponding to the seed data and further configured to forward the copy of the incoming credit card/debit card transaction to the user for a determination of whether the incoming attempted credit card/debit card transaction notification was conducted by breaching the secured private information database listing.

Similar to the system embodiment, a method of tracking seed data is also contemplated. The method may include the step of providing a computer connected to a network, wherein the computer is connected to a database and the database is configured to store a record of the seed data and to store a pre-recorded voice message corresponding to a phone number defined by the seed data. The method may also monitor incoming communications to the network, wherein upon receiving a notice of an incoming phone call placed to the phone number corresponding to the seed data, the method plays back to a recipient of the incoming phone call, the pre-recorded voice message and stores a caller identification phone number and/or records a caller voice message from the incoming phone call. The method could also forward the caller identification phone number and/or recorded caller voice message from the incoming phone call to a user for determining whether the incoming phone call was conducted by breaching the secured private information database listing.

Further methods may also be provided for creating seed data for a secured private information database listing. The method including the steps of creating a seed data listing, wherein the seed data listing includes at least the following information, a name, a telephone number, a credit card/debit card number, and an email address, recording and storing a voice message linked to the telephone number, such that when the telephone number is called the voice message can be replayed, and sending the seed data listing to a user for insertion into a secured private information database listing.

Numerous other advantages and features of the invention will become readily apparent from the following detailed description of the invention and the embodiments thereof, from the claims, and from the accompanying drawings.

DESCRIPTION OF THE DRAWINGS

A fuller understanding of the foregoing may be had by reference to the accompanying drawings, wherein.

DETAILED DESCRIPTION OF THE EMBODIMENTS

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Figure 1:
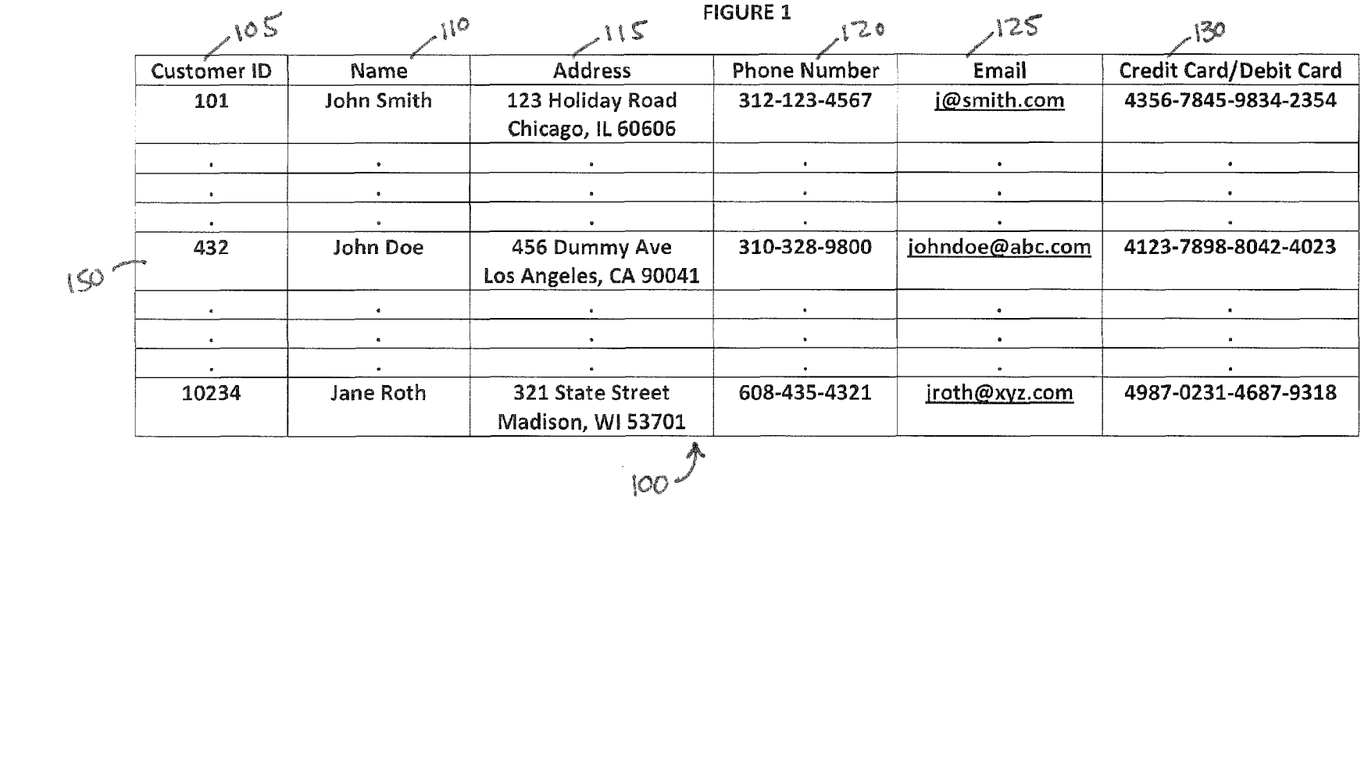
FIG. 1 is an illustration of a company private information database.

In the present invention, the creation of seed data into a company's private information will be described along with a method and system used to monitor the seed data, track and store information when the seed data is used, and report the stored information back to the company for proper handling. As mentioned above the company's private information can be a very valuable piece of property. New and novel methods to safeguard this information is important to the fabric of the company. The private information can be any type of simple or complex database of information that relates to real individuals. For example, FIG. 1 illustrates an exemplarily listing. The private information database 100 can include, but is not limited to, a customer id 105 assigned by the company; a person's name 110; the person's address 115; the person's phone number 120, and the person's email 125. The database 100 can include N number of entries. To seed the private information, a third party provider (referred to herein as "the Provider") will create seed data 150 that matches all or most of the database fields and will either provide the seed data to the company for entry into its database; or the Provider if given a copy of the database will insert the seed data themselves. The seed data may be a single entry or multiple entry in the database 100.

Figure 2:
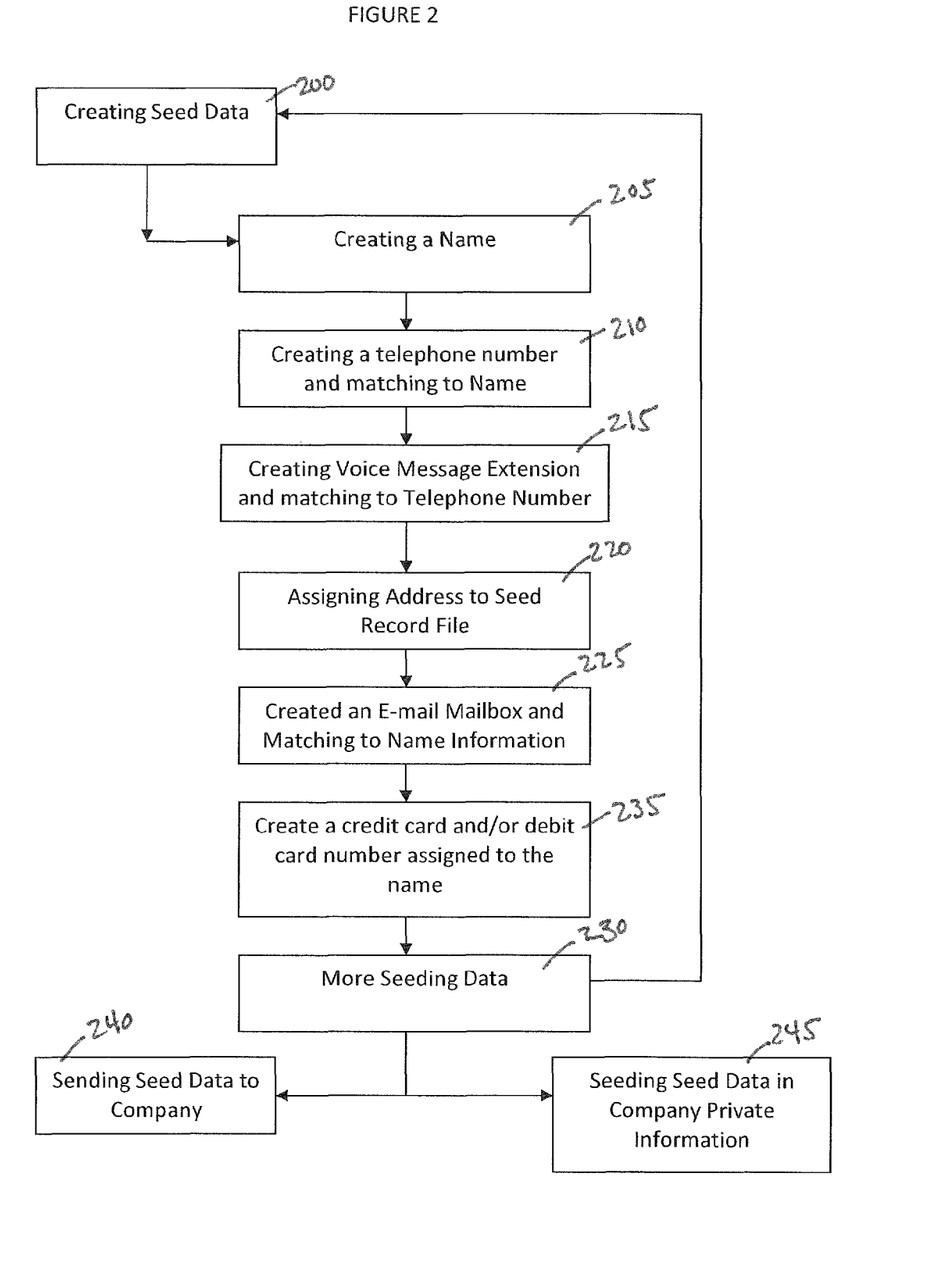
FIG. 2 is a method of creating seed date for insertion into the database.

Referring now to FIG. 2, in one embodiment of the present invention, the Provider will create seed data for insertion into a private information database 200. As noted above, the seed data will most likely include a person's name 110; the person's address 115; the person's phone number 120, the person's email 125, and credit card/debit card number 130. Therefore, to create the seed data, the Provider creates a name (first and last and in some case a middle initial) 205, creates a telephone number 210, creates a voicemail extension to match to a telephone number and sets up a voicemail message on the voicemail extension 215, assigns a physical address to the name 220, creates an email address that is assigned to the name 225 and creates a credit card/debit card number that is assigned to the name 235. This would be repeated as needed, 230. Once the seed data is created, the Provider can either send the information to the company for insertion into its own private information database 240 or the Provider can insert the seed data itself, if access to the private information database 245 is provided.

For the creation of telephone number, voicemail extensions and voicemail messages, the Provider may use an IP-PBX or an Internet Protocol Private Brach eXchange system. These systems are well known in the industry and permit a Provider to have a number of telephone lines that are connected to the public switched telephone network by trunk lines. The IP-PBX system also allows the Provider to set up fax lines and link a voicemail to a telephone number. The IP-PBX further includes voicemail to email recording, called ID recording, call monitoring and screening and a host of other features.

With the seed data inserted into the company's private information database, the Provider having set up the seed data and the corresponding telephone number, email address, voice message mail box, and physical address can begin monitoring the incoming communications directed to the seed data. As noted above, the company may use the database for a number of marketing or communication reasons. These marketing or communications may be direct mailing to a physical address, email communications, or telemarketing. The reasons for the communications is not important or the subject of the invention. However, all of these communications are typically done for legitimate purposes. However, at any given point or time, the private information database may become compromised, stolen either in part or in whole, or used inappropriately. Providing the company with information regarding communications to the seed data is invaluable. The information on the communications can be checked by the company against its marketing efforts to ensure the communication was proper, timely, efficient and/or accurate. Since the company typically releases the database (either in whole or in part) to a third party marketing company does not have any information or knowledge that the database includes seed data. Moreover, since the information is accurate and corresponds to actual extensions (phone, email, physical address), the marketing company or more importantly any third party user of the database does not know which data relates to real data or seed data. Marking the ability to identify and remove seed data from real data nearly impossible. The Provider, in some cases, may be the only party that truly knows the identify of the seed data.

Figure 3:
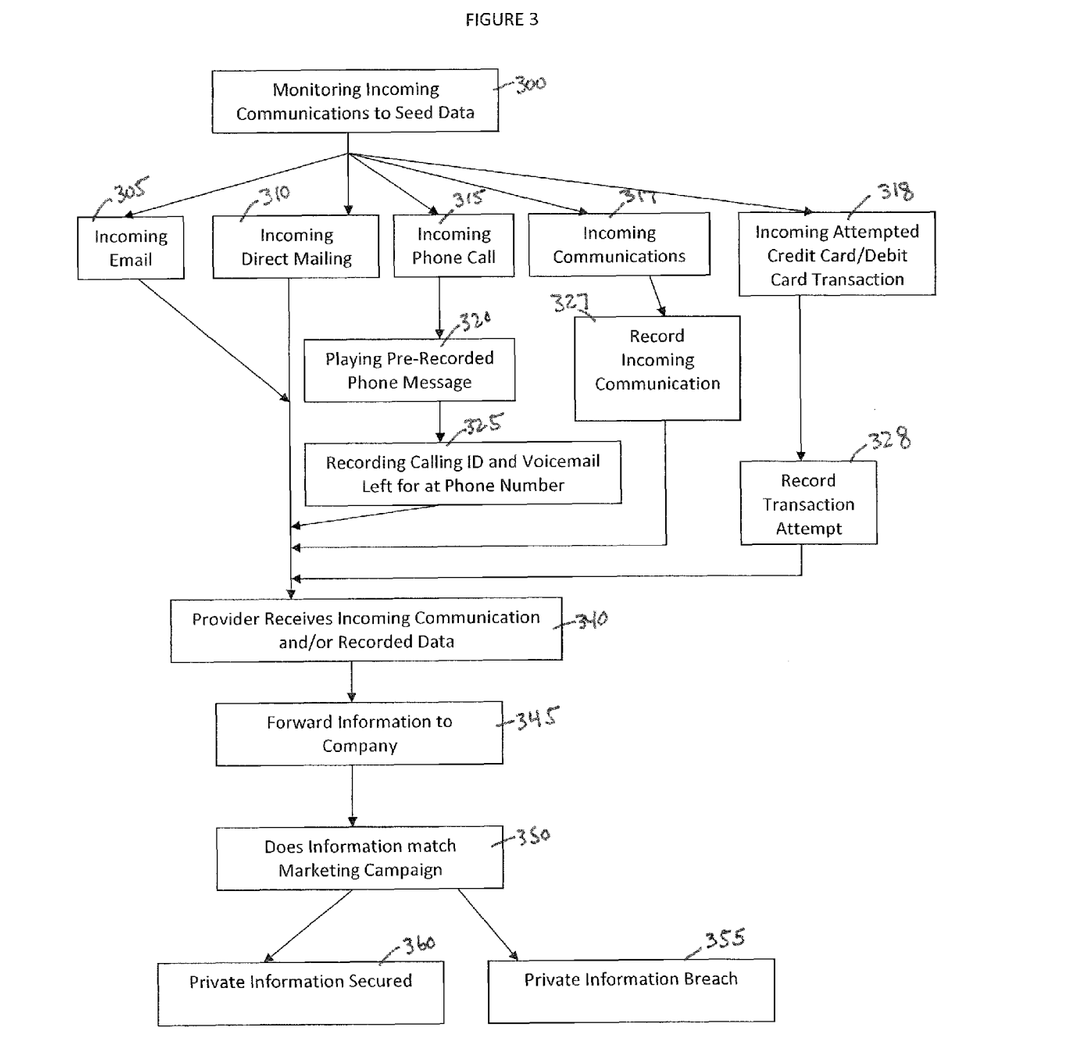
FIG. 3 is a method of monitoring incoming communications and reporting the same to the company for comparison to its marketing campaigns.

Referring now to FIG. 3, the Provider monitoring incoming communications to the seed data 300. The monitoring of the incoming communications includes incoming emails 305, incoming direct mailing 310, incoming phone calls 315, incoming attempted credit card/debit card transactions 318, and other incoming communications 317 such as a text message, an instant message, a SMS (short message service) message, an EMS (enhanced messaging service), a MMS (multimedia messaging service) message, text messages through emails, a photo, a video clip, a fax message, internet relay chat, and other communications which may be forthcoming in the future. While monitoring emails and direct mailing has typically been done in the past by other providers in general, the monitoring and handling of the incoming phone calls 315 and credit card/debit card numbers 318 is unique and novel to the invention.

When an incoming phone call is received to a seed data, the third party will hear a normal voice message 320. However, with the use of the IP-PBX system, the system records any messages left by the third party along with the caller id information, which may include name and/or phone number of the third party 325. This recorded information (message left by third party as a way file and called id information as data) will be emailed to the Provider monitoring the seed data. Similarly, incoming email, incoming attempted credit card/debit card transactions, or incoming direct mailing pieces will be forwarded to the Provider monitoring the seed data. The Provider's receipt of various incoming communications and recorded information relating to the seed data is noted at box 340. In some cases a individual at Provider may be designated to receive the incoming communications and recorded information.

Since in most common cases, the Provider does not have knowledge or access to the company's marketing efforts, the Provider which receives the incoming communications and recorded information will forward the same to the company 345. The company may then compare the incoming communications and/or recorded information against its own marketing efforts to determine if the communication was proper, timely, and/or efficient 350. If the incoming communications and/or recorded information was not authorized 355 by the company then the company has virtually immediate knowledge that its database has been comprised. This will allow them to take immediate action, such as tracking the improper communication back to the source and informing them that the use of the database was in breach of their confidential information. Conversely, if the incoming communications and/or recorded information was proper, then the company can have some sense that its private information database is still secured 360.

In addition, other incoming communications 317 such as a text message, an instant message, a SMS (short message service) message, an EMS (enhanced messaging service), a MMS (multimedia messaging service) message, text messages through emails, a photo, a video clip, a fax message, internet relay chat, and other communications which may be forthcoming in the future, can be monitored and recorded 327 when sent to the seed data. The incoming communication would then forward the same to the company 345.

Furthermore, when an attempted transaction is made on a credit card or debit card number that was created and populated in the database 100, the attempted transaction is received 318 by the system. The attempted transaction is recorded 328 and then forwarded to the company 345.

Figure 4:
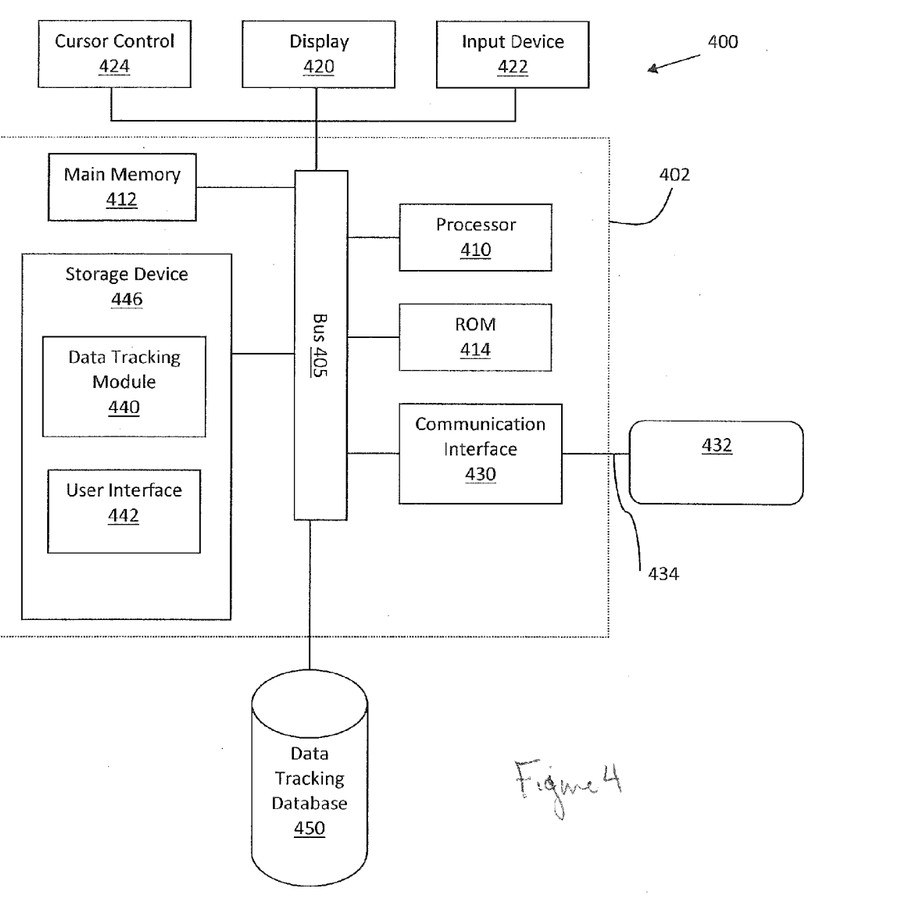
FIG. 4 is a block diagram of a computer system in accordance with one embodiment of the present invention.

Referring now to FIG. 4, a illustrated system computer 400 is provided in more detail. The system computer 400 comprises a number of standard computer components, including a bus 405 or other communication mechanism for communicating information and a processor 410 coupled with the bus 405 for processing information. The system computer 400 also includes a main memory 412, such as a random access memory (RAM) or other dynamic storage device and a read-only memory (ROM) 414 or other static storage device, both of which are coupled to the bus 405. The system computer 400 may be coupled via the bus 405 to a display 420, an input device 422, and a cursor control 424.

The term "computer-readable instructions" as used herein refers to any instructions or data that may be performed or used by the processor 410 or other components. Similarly, the term "computer-readable medium" refers to any storage medium that can store computer-readable instructions. Such a medium may take many forms, including, but not limited to, non-volatile media, volatile media, and transmission media. Non-volatile media include, for example, optical or magnetic disks, such as the storage device. Volatile media include dynamic memory, such as main memory. Transmission media include coaxial cables, copper wire and fiber optics, including wires of the bus. Transmission media can also take the form of acoustic or light waves, such as those generated during radio frequency (RF) and infrared (IR) data communications.

The system computer 400 also includes a communication interface 430 coupled to the bus 405. The communication interface 430 provides a two-way data communication coupling between the system computer 400 and a network 432, such as the IP-PBX system, a local area network (LAN), the Internet, wireless or cellular network, or Public Switched Telephone Network (PSTN). For example, the communication interface 430 may be an integrated services digital network (ISDN) card or a modem used to provide a data communication connection to a corresponding type of telephone line. As another example, the communication interface may be a LAN card used to provide a data communication connection to a compatible LAN. A network link 434, which may be a wired or wireless link, typically provides data communication through the network 432 to other data devices. In any such implementation, the communication interface 430 sends and receives electrical, electromagnetic, optical, or other signals that carry digital data streams representing various types of information.

A data tracking module 440 and a user interface module 442 are stored on the system computer 400, for example, in the storage device 446. The data tracking module 440 comprises a number of computer-readable instructions that, when executed by the system computer 400, allows a user to create and store records of data on the system database 450 in the manner described above. The user interface module 442 allows a user to interact with the data tracking module 440 to create and store the records (and subsequently retrieve the records). The records provide the user with information regarding the seed data. When the system computer receives a hit on a seed data, information is provided to a user, which may then determine, for example, what information may need to be further shared with the company or the system computer may have instructions to automatically forward the information to the company and a user.

In one aspect of the invention there is provided a system relating to tracking seed data. Seed data may be defined in a number of different embodiments, but will in most instances include information relating to a name, phone number, credit card/debit card number, and email address. The seed data is inserted into a secured private information database listing. A system in accordance with one embodiment includes a network, a computer connected to the network, and a database connected to the computer. The database is configured to store a record of the seed data and further configured to store a pre-recorded voice message corresponding to a phone number defined by the seed data. The computer is configured to monitor incoming communications to the network. Upon receiving a notice of an incoming phone call placed to the phone number corresponding to the seed data, the computer is further configured to playback to a recipient of the incoming phone call, the pre-recorded voice message and further configured to store a caller identification phone number and/or record a caller voice message from the incoming phone call. The computer is further configured to forward the caller identification phone number and/or recorded caller voice message from the incoming phone call to a user for a determination of whether the incoming phone call was conducted by breaching the secured private information database listing.

In one embodiment of the present invention there is provided a monitoring security system for tracking seed data. The system includes the seed data for insertion into a secured private information database listing. The seed data would in one instances include the following information data strings: a fictitious name having both a first and last name portion, an email address associated with the fictitious name that is capable of receiving email communications, and a phone number created to match to and assigned with the fictitious name that is capable of receiving telephone and/or fax communications. The system further includes a network and a computer connected to the network and configured to monitor incoming communications to the network. A database is also provided and connected to the computer. The database is configured to store a record of the seed data and a pre-recorded voice message corresponding to the phone number defined by the seed data. The computer, upon receiving a notice of an incoming phone call placed to the phone number corresponding to the seed data, has software configured to playback to an intended recipient of the incoming phone call, the pre-recorded voice message and is further configured to store a caller identification phone number and/or record a caller voice message from the incoming phone call. In addition, the software is further configured to forward the caller identification phone number and/or recorded caller voice message from the incoming phone call to a user for a determination of whether the incoming phone call was conducted by breaching the secured private information database listing. Lastly, the software, upon receiving a notice of an incoming communication from a third party to the seed data, is further configured to store third party identification information associated with the incoming communication and/or a copy of the incoming communication and the software is further configured to forward the third party identification information and/or the copy of the incoming communication to the database and/or to a user for determining whether the incoming communication was conducted by breaching the secured private information database listing.

In this or any of the further embodiments incoming communications can include, but is not limited to, one or more of the following: e-mail communications, telecommunication calls, text messages, instant messages, short message service messages, and multimedia messaging service messages, enhanced messaging service messages, multimedia messaging service messages, photos, video clips, fax messages, internet relay chat messages, and attempted credit card and/or debit card transactions.

In addition, the system may include software further configured to store a copy of an incoming email made to the email address corresponding to the seed data and be further configured to forward the copy of the incoming email to the database and to the user for a determination of whether the incoming email was conducted by breaching the secured private information database listing.

In another embodiment of the present invention there is provided a method for a security monitoring system that tracks fictitious seed data against theft of a secured private information database listing that contains the fictitious seed data. The method would include the various steps, such as creating seed data for insertion into a secured private information database listing. The seed data would typically include the following information data strings, a fictitious name having both a first and last name portion, an email address associated with the fictitious name that is capable of receiving email communications and a phone number created to match to and assigned with the fictitious name that is capable of receiving telephone and/or fax communications. The method further includes the step of providing a computer and a database connected to a network and the step of storing a record of the seed data on the database and storing a pre-recorded voice message corresponding to the phone number defined by the seed data on the database. The method would then monitor incoming communications to the network and upon receiving a notice of an incoming phone call placed to the phone number corresponding to the seed data, the method would play back to a recipient of the incoming phone call the pre-recorded voice message and then store a caller identification phone number and/or recording a caller voice message from the incoming phone call. The method next forwards the caller identification phone number and/or recorded caller voice message from the incoming phone call to the database and/or to a user for determining whether the incoming phone call was conducted by breaching the secured private information database listing. Finally, the computer, upon receiving a notice of an incoming communication from a third party to the seed data, has software configured to further store third party identification information associated with the incoming communication and/or a copy of the incoming communication and the computer further has software configured to forward the third party identification information and/or the copy of the incoming communication to the database and to a user for determining whether the incoming communication was conducted by breaching the secured private information database listing.

In other aspects of the method, additional steps may be provided including storing a copy of an incoming email made to an email address corresponding to the seed data and forwarding the copy of the incoming email to the user for a determination of whether the incoming email was conducted by breaching the secured private information database listing.

In yet another embodiment of the present invention there is provided a method for a security monitoring system of tracking fictitious seed data against theft of a secured private information database listing containing the fictitious seed data. The method includes creating seed data for insertion into a secured private information database listing, wherein the seed data includes the following information data strings, a fictitious name having both a first and last name portion, a real email address associated with the fictitious name and a real phone number created to match to and assigned with the fictitious name; providing a computer connected to a network, wherein the computer is connected to a database and the database is configured to store a record of the seed data and to store a pre-recorded voice message corresponding to the phone number defined by the seed data; monitoring incoming communications to the network; wherein upon receiving a notice of an incoming phone call placed to the phone number corresponding to the seed data, playing back to a recipient of the incoming phone call the pre-recorded voice message and storing caller identification information; wherein upon receiving a notice of another type of incoming communication from a third party and sent to the send data, such as a text message, an instant message, a short message service message, an enhanced messaging service message, a multimedia messaging service message, a photo, a video clip, a fax message, an internet relay chat message, email or direct mailing communication, storing third party identification information; and forwarding the third party identification information to a user for determining whether the incoming communication was conducted by breaching the secured private information database listing.

As outlined herein the computer being configured to handle various tasks would be defined by various software and/or hardware components either distributed across numerous aspects of the bus or contained on a single aspect. Therefore, the aspects of the computer being configured can be defined as software running on the computer and being configured to conduct various tasks and responses. In but another aspect of the present invention there is provided a monitoring security system for tracking seed data. The system includes seed data for insertion into a secured private information database listing, wherein the seed data includes the following information data strings, a fictitious name having both a first and last name portion and a fictitious credit card and/or debit card number. A computer is provided and is connected to a network and configured to monitor incoming communications. A database is connected to the computer and is configured to store a record of the seed data. The computer, upon receiving a notice of an attempted transaction on the fictitious credit card and/or debit card number corresponding to the seed data, has software configured to store third party identification information relating to the attempted transaction and the software is further configured to forward the third party identification information and/or a copy of the attempted transaction to the database and/or to a user for determining whether the attempted transaction was conducted by breaching the secured private information database listing.

The system may also have seed data that further includes a phone number created to match to and assigned with the fictitious name that is capable of receiving telephone and/or fax communications. The database would be further configured to store a pre-recorded voice message corresponding to the phone number defined by the seed data and the computer, upon receiving a notice of an incoming phone call placed to the phone number corresponding to the seed data, having software configured to playback to an intended recipient of the incoming phone call, the pre-recorded voice message and further configured to store a caller identification phone number and/or record a caller voice message from the incoming phone call. The system may also have software further configured to forward the caller identification phone number and/or recorded caller voice message from the incoming phone call to a user for a determination of whether the incoming phone call was conducted by breaching the secured private information database listing.

In yet further aspects of this embodiment the seed data may further include an email address associated with the fictitious name that is capable of receiving email communications. The system in this instance would have software configured to store a copy of an incoming email made to the email address corresponding to the seed data and further configured to forward the copy of the incoming email to the database and to the user for a determination of whether the incoming email was conducted by breaching the secured private information database listing.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

We claim:

1. A monitoring security system for tracking seed data comprising:
    seed data for insertion into a secured private information database listing, wherein the seed data includes the following information data strings, a fictitious name having both a first and last name portion and a fictitious credit card and/or debit card number, and the seed data further includes a phone number created to match to and assigned with the fictitious name that is also capable of receiving telephone and/or fax communications;
    a network;
    a computer connected to the network and configured to monitor incoming communications to the network;
    a database connected to the computer, the database configured to store a record of the seed data, and the database is further configured to store a pre-recorded voice message corresponding to the phone number defined by the seed data;
    the computer, upon receiving a notice of an attempted transaction on the fictitious credit card and/or debit card number corresponding to the seed data, having software running on a processor of the computer to store third party identification information relating to the attempted transaction and the software is further configured to forward the third party identification information and/or a copy of the attempted transaction to the database and/or to a user for determining whether the attempted transaction was conducted by breaching the secured private information database listing, and
    the computer, upon receiving a notice of an incoming phone call placed to the phone number corresponding to the seed data, having software configured to playback to an intended recipient of the incoming phone call, the pre-recorded voice message and further configured to store a caller identification phone number and/or record a caller voice message from the incoming phone call; and
    the software being further configured to forward the caller identification phone number and/or recorded caller voice message from the incoming phone call to a user for a determination of whether the incoming phone call was conducted by breaching the secured private information database listing.

2. The system of claim 1, wherein the network includes an IP-PBX network.

3. The system of claim 1, wherein the seed data further includes an email address associated with the fictitious name that is capable of receiving email communications.

4. The system of claim 3 further comprising:
    the software being further configured to store a copy of an incoming email made to the email address corresponding to the seed data; and
    the software is further configured to forward the copy of the incoming email to the database and to the user for a determination of whether the incoming email was conducted by breaching the secured private information database listing.

5. The system of claim 3, wherein the software, upon receiving a notice of an incoming communication from a third party to the seed data, is further configured to store third party identification information associated with the incoming communication and/or a copy of the incoming communication and the software is further configured to forward the third party identification information and/or the copy of the incoming communication to the database and/or to a user for determining whether the incoming communication was conducted by breaching the secured private information database listing.

6. The system of claim 5, wherein the incoming communication includes, but is not limited to, one or more of the following: e-mail communications, telecommunication calls, text messages, instant messages, short message service messages, and multimedia messaging service messages, enhanced messaging service messages, multimedia messaging service messages, photos, video clips, fax messages, and internet relay chat messages.

7. A method for a security monitoring system of tracking fictitious seed data against theft of a secured private information database listing containing the fictitious seed data, the method comprising:
    creating seed data for insertion into a secured private information database listing, wherein the seed data includes the following information data strings, a fictitious name having both a first and last name portion and a fictitious credit card number and/or fictitious debit card number associated to the fictitious name;
    providing a computer connected to a network, wherein the computer is connected to a database and the database is configured to store a record of the seed data;
    monitoring incoming communications to the network;
    wherein upon receiving a notice of an attempted transaction on the fictitious credit card and/or debit card number corresponding to the seed data, storing information on the attempted transaction; and
    forwarding information on the attempted transaction to a user for determining whether the incoming communication was conducted by breaching the secured private information database listing, and wherein the seed data further includes a real email address associated with the fictitious name and the method further includes the step of storing a copy of an incoming email made to an email address corresponding to the seed data and forwarding the copy of the incoming email to the user for a determination of whether the incoming email was conducted by breaching the secured private information database listing, and wherein the seed data further includes a real phone number created to match to and assigned with the fictitious name and the method further includes the step of storing a pre-recorded voice message corresponding to the phone number defined by the seed data and wherein upon receiving a notice of an incoming phone call placed to the phone number corresponding to the seed data, playing back to a recipient of the incoming phone call the pre-recorded voice message and storing caller identification information, and forwarding the caller identification information to a user for determining whether the incoming communication was conducted by breaching the secured private information database listing.

8. The method of claim 7, wherein upon receiving a notice of another incoming communication from a third party and sent to the seed data, such as a text message, an instant message, a short message service message, an enhanced messaging service message, a multimedia messaging service message, a photo, a video clip, a fax message, or an internet relay chat message, storing third party identification information; and forwarding the third party identification information to a user for determining whether the incoming communication was conducted by breaching the secured private information database listing.

9. The method of claim 8, wherein the caller identification information includes a caller identification information phone number and/or recorded caller voice message from the incoming phone call.

10. A method for a security monitoring system of tracking fictitious seed data against theft of a secured private information database listing containing the fictitious seed data, the method comprising:

creating seed data for insertion into a secured private information database listing, wherein the seed data includes the following information data strings, a fictitious name having both a first and last name portion, a real email address associated with the fictitious name and a real phone number created to match to and assigned with the fictitious name;

providing a computer connected to a network, wherein the computer is connected to a database and the database is configured to store a record of the seed data and to store a pre-recorded voice message corresponding to the phone number defined by the seed data;

monitoring incoming communications to the network;

wherein upon receiving a notice of an incoming phone call placed to the phone number corresponding to the seed data, playing back to a recipient of the incoming phone call the pre-recorded voice message and storing caller identification information;

wherein upon receiving a notice of another type of incoming communication from a third party and sent to the send data, including: a text message, an instant message, a short message service message, an enhanced messaging service message, a multimedia messaging service message, a photo, a video clip, a fax message, an internet relay chat message, email message, or direct mailing communication, storing third party identification information associated with the third party; and forwarding the third party identification information to a user for determining whether the incoming communication was conducted by breaching the secured private information database listing.

* * * * *